April 19, 1932. E. C. MOGFORD ET AL 1,854,416

METAL WHEEL

Filed April 19, 1926

Witness
Milton Lenoir

Inventors
Edmund C. Mogford
Frederick W. Burger
By John L. Jackson
Attorney

Patented Apr. 19, 1932

1,854,416

UNITED STATES PATENT OFFICE

EDMUND C. MOGFORD, OF BUCHANAN, AND FREDERICK W. BURGER, OF NILES, MICHIGAN, ASSIGNORS TO CLARK EQUIPMENT COMPANY, OF BUCHANAN, MICHIGAN, A CORPORATION OF MICHIGAN

METAL WHEEL

Application filed April 19, 1926. Serial No. 102,892.

The present invention relates to metal wheels of the spoke type and embodies improvements upon the invention disclosed in our co-pending application Serial No. 33,657 filed May 29, 1925. (The copending application on November 13, 1928, matured into Patent No. 1,691,163.)

In this co-pending application we have disclosed an improved construction of metallic wheel and method of making the same wherein the wheel is built up or constructed from a cast metal spider, which constitutes a hub and hollow spoke structure, and a continuous metal rim which is secured upon the outer ends of this hollow spoke structure. One of the features of the aforesaid invention resides in the manner of securing this metal rim in interlocking engagement with the ends of the hollow spokes. In the particular method therein disclosed, the metal of the rim is pressed into the open outer ends of the spokes, forming drawn depressions or punched spigots extending into the ends of the spokes.

The subject matter of the present application differs from that of this co-pending application in the manner of securing the rim to the spoke structure. According to this invention, the rim is secured to the spokes by producing a multiplicity of points of interlocking engagement between the rim and each spoke, which points of engagement are distributed over a considerable area on the outer end of the spoke. By joining the rim and spoke according to the present method, the metal in the rim does not have to be drawn or extruded through any considerable distance and consequently there is no tendency for attenuation or destructive strain of the metal. This is of decided advantage in many instances, because of the varying thickness or gauges of metal used in different rims. This method of joining is also advantageous in that a very strong interlocking joint is secured.

The nature of our invention will clearly appear from the following description, taken in connection with the accompanying drawings in which Fig. 1 is a fragmentary side elevational view of a wheel embodying our invention.

Figure 1:
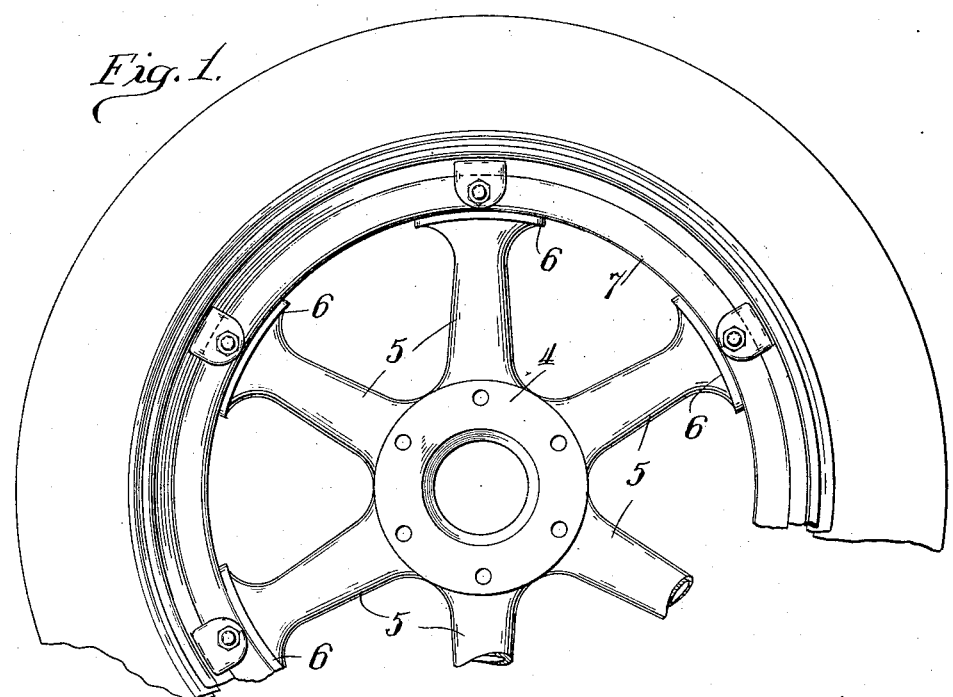

Our improved wheel comprises a hub and spoke structure cast as a unit, the spokes being hollow and relatively thick and short and provided at their outer ends with pads or laterally extended seats adapted to receive and support a rim of conventional form. The rim has relatively great strength to resist bending and crushing and will support a great load in tension. The casting that constitutes the hub and spokes may be made of steel or malleable iron, and the rim is a steel band of the usual form providing a felly which supports a tire carrying rim, preferably of the demountable type. Referring to the drawings,—4 indicates the hub portion of the casting, 5 the spokes, and 6 the pads at the outer ends of these spokes which support the rim 7. The pads 6 are chamfered at one side along their outer margins to facilitate pressing the hollow spoke structure into the rim, as will be presently described.

Figure 3:
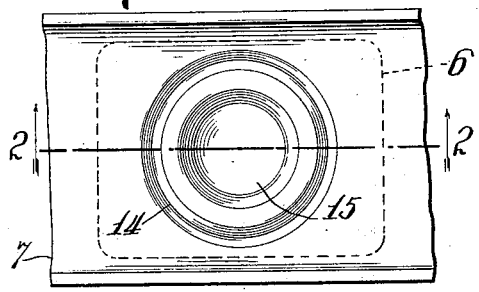
Fig. 3 is a fragmentary plan or outer elevational view of the rim showing the interlocking deformations therein.
Figure 4:
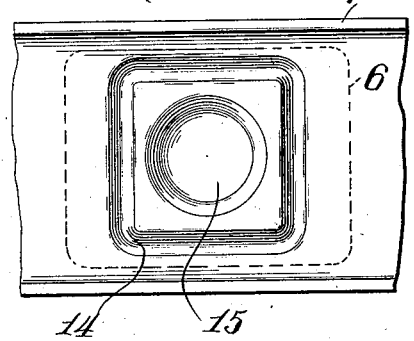
Fig. 4 is a similar view showing an interlocking bead of modified outline.
Figure 2:
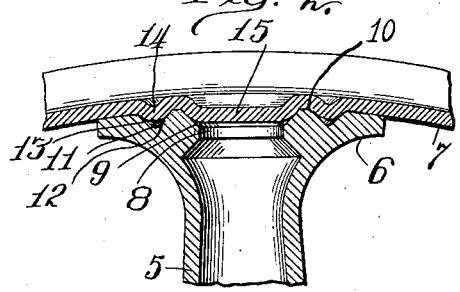
Fig. 2 is a detail sectional view of the interlocking joint produced between the rim and the outer end of each spoke, this view corresponding to a section taken on the plane of the line 2—2 of Fig. 3.

Referring to Fig. 2, the spokes 5 are hollow, and the end of each spoke opens out through the outer surface of its pad 6 through the hole 8. The margin of this hole or opening 8 is preferably tapered or beveled to form the inclined interlocking surface 9. Formed in the outer surface of the pad 6 and surrounding the opening 8 is a substantially continuous groove or surface indentation 11, which is spaced from the opening or depression 8 laterally with respect to the axis of the spoke. This groove may be either of U-shaped or V-shaped section, preferably the latter, however, so as to form two sloping locking surfaces 12 and 13 on either side of the depression 11. The groove 11 may be of circular outline, as shown in Fig. 3, or may be oval or rectangular in form, the latter construction being shown in Fig. 4. The depression 8, or the beveled surface 9, together with the groove 11 define an intermediate ridge or high point 10 therebetween, across which the metal of the rim can be stretched as will hereinafter appear.

In constructing the wheel, the unitary hub and spoke structure which initially is of a larger outer diameter than the inner diameter of the rim is first forced laterally into the continuous rim 7 which constitutes a felloe of outwardly facing U or channel section to bring the pads 6 to their proper points relative to the width of the rim. The diameter of the spider with respect to the rim is such that heavy pressure is required to force it into the rim and the chamfered side edges of the pads 6 facilitate this forced insertion of the spoke structure into the rim. To enable the spider to be forced laterally into the rim it is desirable that the outer or peripheral surfaces of the spoke ends or pads be approximately cylindrical to conform to the inner cylindrical surface of the rim. The action of forcing the spider into the felloe places the felloe under a relatively great tension and the spider under a consequent relatively great compression and the wheel remains in this condition at all times even under load. The wheel is then presented to the action of a suitable power press having a suitably formed pressing die which operates upon the outer surface of the rim directly over a spoke end, this spoke end and pad being fixedly held in a stationary die. By thus supporting the pad 6 when the depression of the web into the groove 14 and recess 15 occurs the stress required to force the web of the channel into the recess or recesses in the pad does not come upon the rest of the wheel. This is highly advantageous as it localizes the stress upon a part that is well adapted to sustain great pressure individually, namely, the pad 6. The pressing die presses a bead 14 from the web of the rim down into the groove 11. Simultaneously therewith this die presses or draws a cup shaped depression 15 down into the opening 8 in the end of the spoke. Such depression of the metal of the web of the channel shaped felloe into the groove 14 and recess 15 tends to increase still further the tension of the rim upon the outside of the spider.

It will be evident that the bead 14 thus formed in this pressing operation will have interlocking engagement with the two concentric locking surfaces 12—13 of the pad 6. Also, the drawn or punched portion 15 will have interlocking engagement with the central interlocking surface 9 formed at the end of the spoke. Thus three lines of interlocking engagement between the rim and the spoke will be secured, as distinguished from the single line of interlocking engagement that characterizes our previous invention wherein the metal is merely pressed down into the open end of the spoke. It will be observed that these three lines of interlocking engagement are distributed considerably over the outer face of the pad 6, which is advantageous in that it distributes any separating stresses between the rim and spoke over a relatively wide area of rim metal. It will also be observed that it is not necessary to draw or extrude the metal through any considerable distance in securing this interlocking relation—the bead 14 and cup 15 both being comparatively shallow—and hence any tendency of the metal to attenuate or to have injurious strains set up therein is avoided. Thus, rims having different thicknesses or gauges of metal may be employed without injury to the rim or weakening of the joint.

Because the flared underside of the pad 6 can be rigidly supported in the stationary die during this operation and because the metal of the rim is backed up by the upper surface of the pad it is possible to exert considerable pressure upon this metal so that this portion of the rim can be stretched tight and in firm contact with the gripping circles or pressure points formed by the locking surfaces 9, 12 and 13.

Since the bead 14 is relatively large in diameter and requires a double bending of the metal of the web, a relatively great pressure is required to form it and force it into the groove 12. The disposition of the parts is such that the holding die for supporting the spoke while this pressing operation occurs lies under and supports substantially directly the part of the pad where the greatest pressure is applied, that is, under the groove 12. At the same time, the pad may be made relatively thin in a radial direction and of graceful appearance, without the danger of being cracked by the immense pressure of the crimping or pressing dies which, for each operation, runs from 8 to 20 tons. There is, therefore, a very real advantage in the construction shown.

This pressing or crimping operation has a double advantage. The first is that it provides the offset or shoulder relation between the web and the spokes for preventing disengagement of the parts in case of accidental injury or damage to a member of the wheels which might relax the tension of the felloe upon the spider. A secondary and highly important advantage which is secured at the same time is that the arch or crown which the web of the felloe tends to assume over the end of the pad is taken up by this pressing or crimping operation. Thereby, a full bearing of the pad upon the web is secured and there is no tendency afterwards, when the wheel is in use, for this arched or crowned metal to become redistributed and the wheel to become loose.

The drawing of the central cup shaped depression 15 is advantageous in that it tends to stretch or draw the metal tightly over the top of the ridge 10; nevertheless, this central depression may be omitted entirely as the interlocking engagement between the bead 14 and the groove 11 is of ample strength. Where this depression 15 is formed in the metal it preferably consists of a drawn form as shown, although if desired, this part of the metal may be punched down into the open end of the spoke to form an inwardly extending spigot.

It will be observed that with the construction described the locking surfaces on the spokes are provided without materially affecting the substantially flat contour of the outer faces of the pads, so that the application of the rim to the ends of the spokes, so as to fit snugly thereon, by forcing the spider by lateral pressure into the rim, is not interfered with.

Having thus described our invention what we claim as new and desire to secure by Letters Patent, is—

1. A metal wheel comprising a cast metal spider constituting a hub and relatively short thick hollow spokes, and a felloe of outwardly facing channel section supported thereupon, the spider being held under radial compression by the rim which is under great tension, each spoke having a substantially central opening and a groove thereabout, the metal of the adjacent wall of the felloe being offset into said opening and into said groove to form interlocking shoulders.

2. In a wheel the combination of a wrought metal felloe under tension, a hollow cast metal spoke having an enlargement at its outer end bearing against the felloe and being under compression, the surface of said enlargement where it bears against the felloe having a shallow groove surrounding the central opening in the hollow spoke, the metal of the felloe being depressed into the central opening and into the groove to provide a plurality of interlocking shoulders between spoke and felloe.

3. In a wheel the combination of an outwardly facing channel shaped wrought metal felloe under tension, a cast metal spoke bearing against the web of the felloe and being under compression, said spoke having an integral enlarged pad at its outer end provided with a central conical depression and a V-shaped groove surrounding the central depression, the web of the felloe being deformed into said depression and into said groove to provide a plurality of interlocking shoulders between felloe and spoke.

4. A wheel comprising a hub and spoke structure held in compression by a rim, each spoke having an enlarged pad at its outer end provided with a central conical depression and a groove surrounding the central depression, said rim being depressed into said depressions and said grooves, said pads serving as supports for the spokes when the rim is depressed into said depressions and grooves.

EDMUND C. MOGFORD.
FREDERICK W. BURGER.